(12) United States Patent
So et al.

(10) Patent No.: US 8,726,292 B2
(45) Date of Patent: May 13, 2014

(54) SYSTEM AND METHOD FOR COMMUNICATION IN A MULTITHREAD PROCESSOR

(75) Inventors: Kimming So, Palo Alto, CA (US); Jason Leonard, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2082 days.

(21) Appl. No.: 11/212,958

(22) Filed: Aug. 25, 2005

(65) Prior Publication Data

US 2007/0067778 A1 Mar. 22, 2007

(51) Int. Cl.
*G06F 9/54* (2006.01)
*G06F 13/24* (2006.01)

(52) U.S. Cl.
CPC ........ *G06F 9/544* (2013.01); *G06F 9/54* (2013.01); *G06F 13/24* (2013.01)
USPC ............................. 719/312; 712/233; 710/260

(58) Field of Classification Search
USPC ............ 719/310, 313, 318; 712/23, 220, 233, 712/244; 710/260–269; 718/100, 102, 718/107–108
See application file for complete search history.

(56) References Cited

U.S. PATENT DOCUMENTS

| | | | |
|---|---|---|---|
| 6,389,449 B1 * | 5/2002 | Nemirovsky et al. | 718/108 |
| 6,477,562 B2 * | 11/2002 | Nemirovsky et al. | 718/108 |
| 6,789,100 B2 * | 9/2004 | Nemirovsky et al. | 718/107 |
| 7,020,879 B1 * | 3/2006 | Nemirovsky et al. | 718/107 |
| 7,035,998 B1 * | 4/2006 | Nemirovsky et al. | 712/215 |
| 7,051,137 B2 * | 5/2006 | Poisner | 710/260 |
| 7,237,093 B1 * | 6/2007 | Musoll et al. | 712/205 |
| 7,257,814 B1 * | 8/2007 | Melvin et al. | 718/104 |
| 7,406,586 B2 * | 7/2008 | Nemirovsky et al. | 712/215 |
| 7,467,385 B2 * | 12/2008 | Nemirovsky et al. | 718/107 |
| 2001/0052053 A1 * | 12/2001 | Nemirovsky et al. | 711/138 |
| 2002/0062435 A1 * | 5/2002 | Nemirovsky et al. | 712/7 |
| 2002/0083173 A1 * | 6/2002 | Musoll et al. | 709/225 |
| 2002/0095565 A1 * | 7/2002 | Nemirovsky et al. | 712/228 |
| 2005/0081214 A1 * | 4/2005 | Nemirovsky et al. | 718/108 |
| 2007/0061619 A1 * | 3/2007 | Nemirovsky et al. | 714/12 |
| 2007/0260852 A1 * | 11/2007 | Nemirovsky et al. | 712/206 |
| 2007/0294702 A1 * | 12/2007 | Melvin et al. | 718/104 |

* cited by examiner

*Primary Examiner* — Qing Wu
(74) *Attorney, Agent, or Firm* — Sterne, Kessler, Goldstein & Fox P.L.L.C.

(57) ABSTRACT

A system and method for Inter-Thread Communication using software interrupts in a multithread processor are disclosed. Bits in a shared control register and/or a private control register can enable an Inter-Thread Communication path. When the interrupt is triggered, one thread processor raises an interrupt in another thread processor.

19 Claims, 3 Drawing Sheets

SYSTEM AND METHOD FOR COMMUNICATION IN A MULTITHREAD PROCESSOR

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Concurrent Multithread (CMT) Processors contain multiple hardware thread units, each multithread processor can execute a program simultaneously. Software interrupt control of a CMT processor may be required for many applications, e.g. digital signal processing (DSP). DSP applications can have program modules that operate at different levels of priority. An operation system may be required to preempt one program module in order to execute another program module of higher priority.

Limitations and disadvantages of conventional and traditional approaches will become apparent to one of skill in the art, through comparison of such systems with some aspects of the present invention as set forth in the present application with reference to the drawings.

BRIEF SUMMARY OF THE INVENTION

Aspects of the present invention may be found in a multithread processor, multiprocessor systems, or multi-core systems. The present invention discloses systems and methods for Inter-Thread Communication. Bits in a shared control register and/or a private control register can enable a communication path. When the interrupt is triggered, one processor may raise a software interrupt in another processor.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate to inter-thread communication in a multithread processor. Although the following description may refer to a particular number of software interrupts and thread processors, other configurations for inter-thread communication can be designed that have a differing number of interrupts and/or thread processors without departing from the spirit and scope of the present invention.

Figure 1:
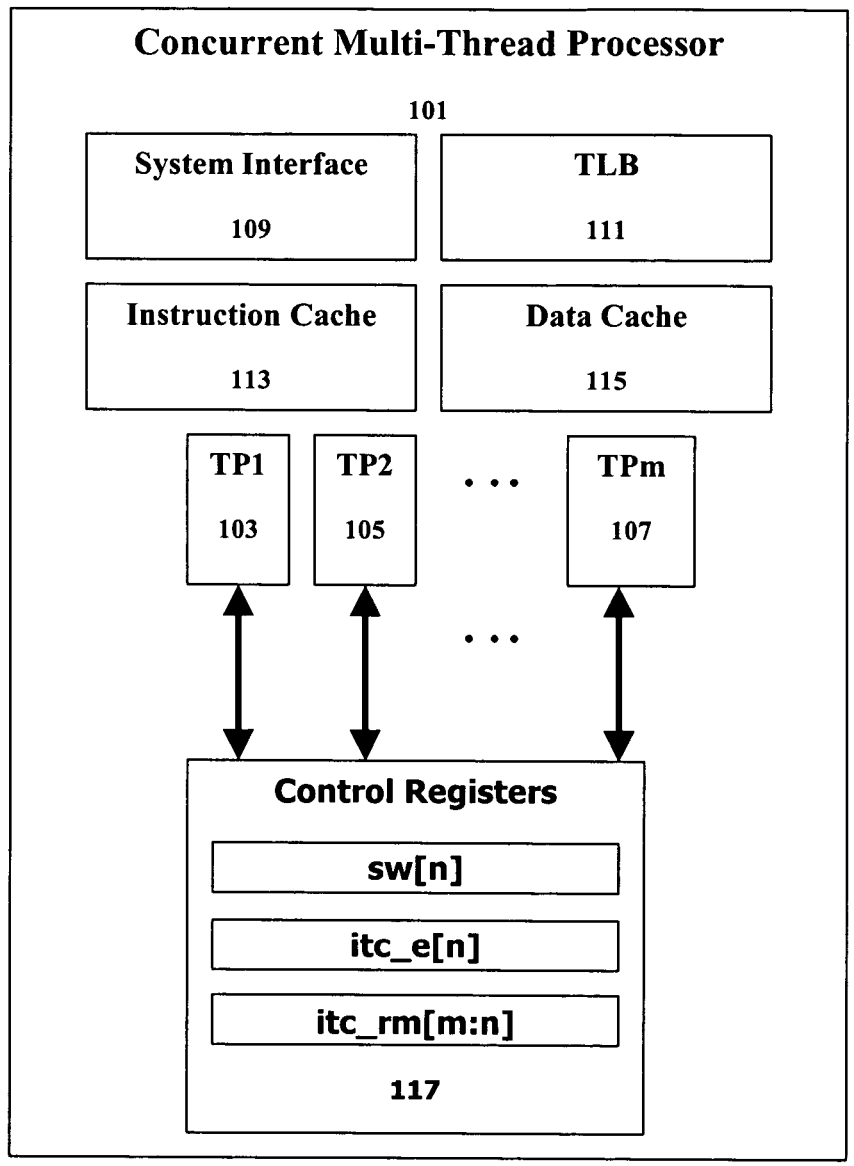
FIG. 1 is a block diagram of an exemplary architecture for communication between thread processors in a concurrent multithread processor in accordance with the present invention.

FIG. 1 is a block diagram of an exemplary architecture 100 for communication between thread processors 103, 105, and 107 in a concurrent multithread (CMT) processor 101 in accordance with the present invention.

The CMT processor 101 contains a set of execution elements, called the thread processors (TP) 103, 105, and 107. Each TP 103, 105, and 107 can execute a program independently and receive external interrupts. TPs 103, 105, and 107 can share system resources such as a system interface 109, a translation look-aside buffer (TLB) 111, an instruction cache 113, and a data cache 115.

Each TP 103, 105, and 107 has a set of control registers 117 to read from and write to. Control registers 117 can index software interrupts through bit fields. For example, sw[1] to sw[n] will correspond to n software interrupts. A 'one' written to one of the bits (i.e. sw[k]=1 where $1 \leq k \leq n$) can trigger software interrupt k, and the processor can execute an interrupt handler in the next step through software interrupt k. At the completion of the interrupt, execution will resume at the instruction following the 'sw[k]=1' command. A software interrupt that is generated and executed on the same TP can be called an internal software interrupt.

In a multithreaded processor, there is a need to communicate from one TP to another. It is advantageous to provide this communication directly and not through system interconnect, e.g. system bus. Communication among the TPs in a CMT processor can be enabled using the internal interrupts. An Inter-Thread Communication. Enable field (i.e. itc_e[n], where n is the software interrupt number) and an Inter-Thread Communication Remote Identifier field (i.e. itc_rm[m:n], where n is the software interrupt number and m is the TP number) can be located in the control registers 117 and may enable communication between TPs. The itc_e and itc_rm registers for each TP may also be allocated in private control registers that are not shared with other TPs.

Figure 2:
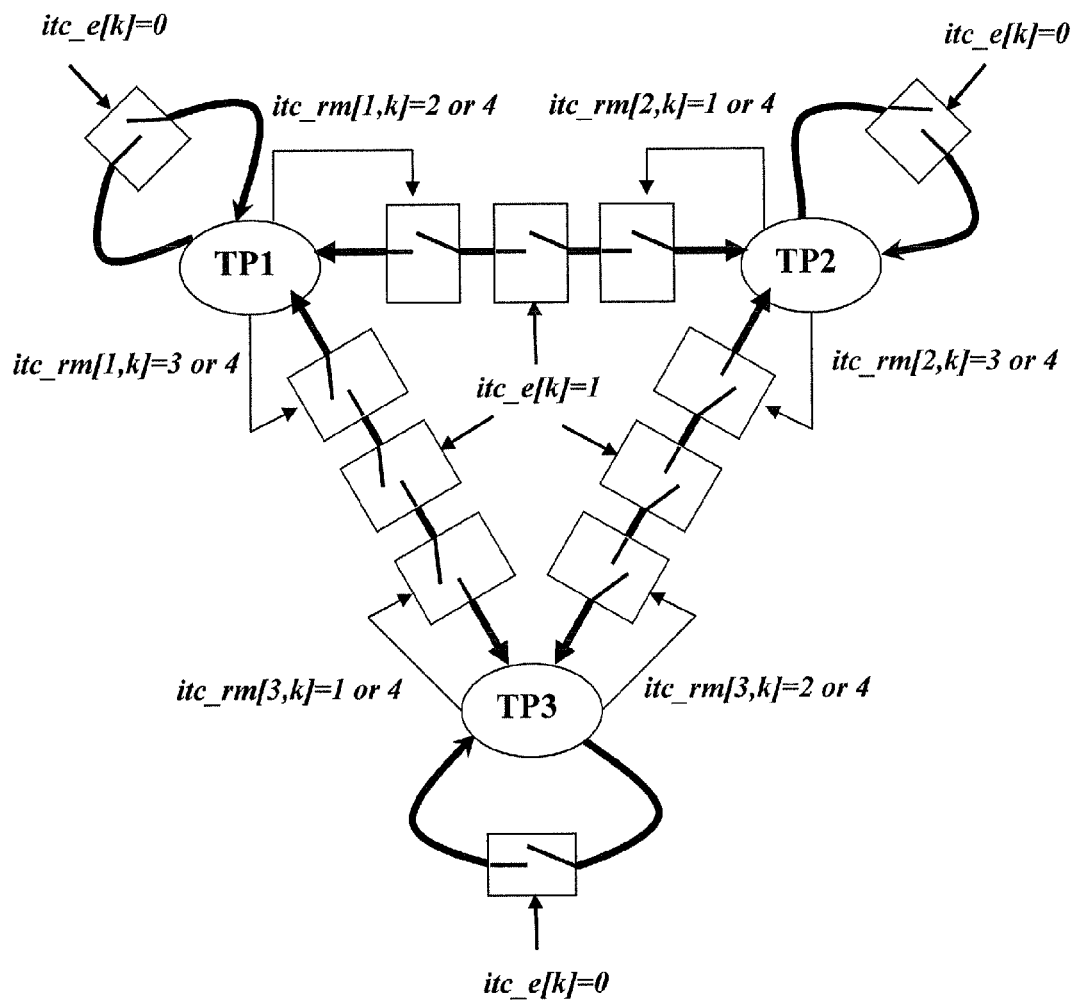
FIG. 2 is an illustration of an exemplary network for communication between thread processors in a concurrent multithread processor in accordance with the present invention.

FIG. 2 is an illustration of an exemplary network 200 for Inter-Thread Communication (ITC) in a concurrent multithread processor in accordance with the present invention. The network 200 comprises 3 TPs—TP1, TP2, and TP3. To communicate between TP1 and TP2 over software interrupt k, int_e[k] is set to 'one'. When int_e is in a shared control register, any TP can set the value. When int_e is in a private control register of each TP would set their corresponding bits.

For a CMT processor with only two TPs, there is one Inter-Thread Communication path. For a CMT processor with three or more TPs, there can be multiple Inter-Thread Communication paths. The itc_rm register can designate the TPs enabled for communication, and the itc_rm register can designate to which other TPs they can communicate. For example, setting itc_rm[X,k]=Y can enable communication from TPX (X=1, 2, or 3) to TPY (Y=1, 2, or 3) byway of software interrupt k. Setting itc_rm[X,k]=4 can enable communication from TPX (X=1, 2, or 3) to TP1, TP2, and TP3 byway of software interrupt k.

When a communication path is complete for the specific case of only two TPs, one TP can cause the execution of an interrupt program on another TP. Communication examples using TP1 and TP2 when itc_e[k]=1 include:

TP1 sets sw[k]=1 to raise ITC and interrupt TP2
TP2 sets sw[k]=1 to raise ITC and interrupt TP1
When itc_e[k]=0, a TP can raise a software interrupt to itself by setting sw[k]=1.

Figure 3:
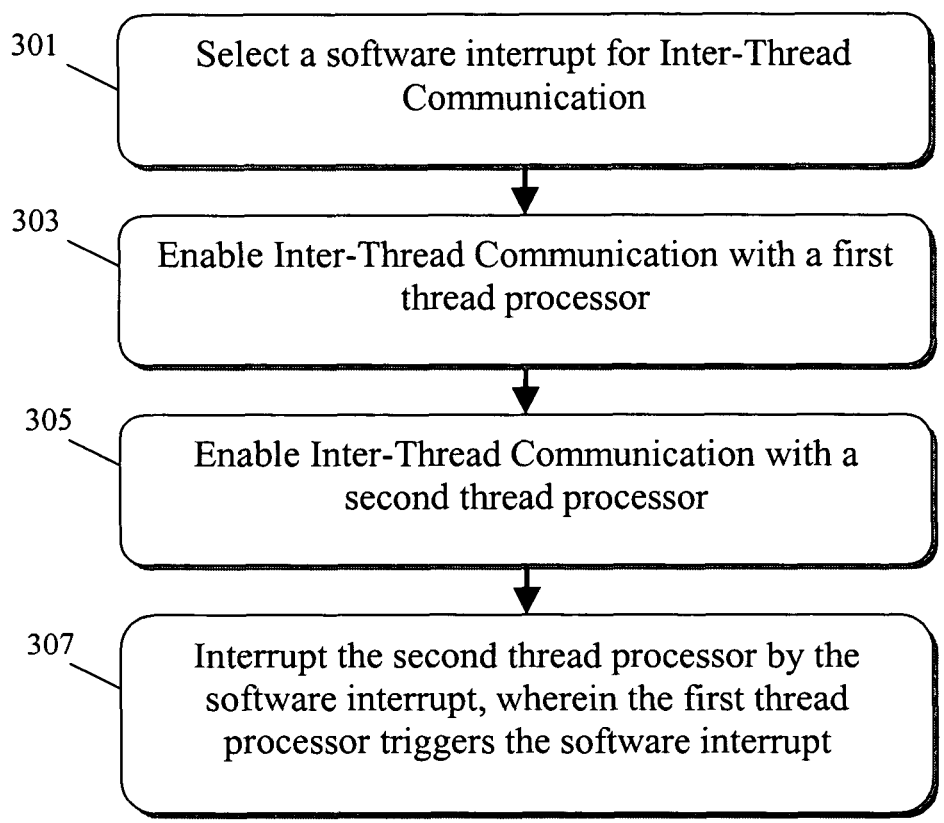
FIG. 3 is a flowchart illustrating an exemplary method for communication in a concurrent multithread processor in accordance with a representative embodiment of the present invention.

FIG. 3 is a flowchart 300 illustrating an exemplary method for Inter-Thread Communication in a concurrent multithread processor in accordance with a representative embodiment of the present invention.

A software interrupt is selected for Inter-Thread Communication at 301. The bit itc_e[k] for 1≤k≤n can be reset to 'zero' by default. To support the use of software interrupt k, the itc_e[k] bit can be set to 'one'. Once a TP sets itc_e[k] in a shared control register, all TPs will use sw[k] to perform Inter-Thread Communication.

If the itc_e register are private, all TPs in an Inter-thread Communication path should enable their itc_e[k] field to allow sending and receiving.

Inter-Thread Communication is enabled with a first thread processor at 303. Inter-Thread Communication is enabled with a second thread processor at 305. To set up an inter-thread communication through sw[k] between the first TP and the second TP, the first TP can write a value of '2' to the itc_rm[1,k] bit, the second TP can write a value of '1' to the itc_rm[2,k] bit.

At 307, the second thread processor is interrupted by the software interrupt, wherein the first thread processor triggers the software interrupt. The first TP can write a 'one' to sw[k] to trigger an Inter-Thread Communication to the second TP byway of raising a software interrupt.

If there are m TPs in the CMT processor, one of the TPs, TPi, can cause an internal interrupt to be raised in the other TPs by writing 'm+1' to the corresponding itc_rm[k]. An option may exist to include TPi in the group of TPs that are interrupted. For example, writing 'm+2' may cause an internal interrupt to be raised in all TPs including TPi.

The present invention is not limited to the particular aspects described. Variations of the examples provided above may be applied to a variety of multithread processors without departing from the spirit and scope of the present invention.

Accordingly, the present invention may be realized in hardware, software, or a combination of hardware and software. The present invention may be realized in a centralized fashion in an integrated circuit or in a distributed fashion where different elements are spread across several circuits. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for inter-thread communication in a multi-thread processor, wherein the method comprises:
   enabling inter-thread communication with a first thread processor and a second thread processor using a shared data storage;
   encountering a first software interrupt instruction at the first thread processor;
   interrupting the first thread processor based on the shared data storage and the encountered first software interrupt instruction;
   encountering a second software interrupt instruction at the first thread processor; and
   interrupting the second thread processor based on the shared data storage and the encountered second software interrupt instruction.

2. The method of claim 1, wherein enabling inter-thread communication with a first thread processor and a second thread processor comprises setting an inter-thread communication field in the shared data storage.

3. The method of claim 2, wherein setting an inter-thread communication field in the shared data storage enables inter-thread communication between the first thread processor and the second thread processor.

4. The method of claim 3, wherein setting an inter-thread communication field in the shared data storage enables inter-thread communication between the first thread processor and a third thread processor.

5. The method of claim 2, wherein setting an inter-thread communication field in the shared data storage enables the first thread processor to send and receive from the second thread processor.

6. The method of claim 1, wherein enabling inter-thread communication further comprises:
   enabling inter-thread communication between the first thread processor, the second thread processor, and a third thread processor, where the first thread processor communicates with the second thread processor and the third thread processor concurrently using a single software interrupt.

7. The method of claim 6, wherein setting an inter-thread communication field in the shared data storage comprises setting an inter-thread communication field in the shared data storage corresponding to each of the first, second, and third thread processors.

8. The method of claim 6, wherein the inter-thread communication occurs without a system interconnect.

9. The method of claim 6, wherein the first, second, and third thread processors are included in an inter-thread communication path by setting an inter-thread communication field in the shared data storage corresponding to each of the first, second, and third thread processors.

10. The method of claim 1, wherein the inter-thread communication occurs without a system interconnect.

11. The method of claim 1, wherein the shared data storage comprises a processor register.

12. A system for inter-thread communication in a multi-thread processor, wherein the system comprises:
   a first thread processor configured to:
      encounter a first software interrupt and a second software interrupt
      trigger the first software interrupt and the second software interrupt using an inter-thread communication shared data storage;
   a second thread processor; and a memory comprising:
- a first software interrupt executed by the first thread processor;
- a second software interrupt executed by the second thread processor; and
- the inter-thread communication shared data storage for enabling communication between the first thread processor and the second thread processor using the first and second software interrupts, wherein the shared data storage includes information specifying the first software interrupt triggers an interrupt at the first thread processor and the second software interrupt triggers an interrupt at the second thread processor.

13. The system of claim 12, wherein the first and second software interrupts are selected from a plurality of software interrupts by setting an inter-thread communication field in the inter-thread communication shared data storage.

14. The system of claim 12, wherein the first thread processor is included in an inter-thread communication path by setting an inter-thread communication field in the inter-thread communication shared data storage.

15. The system of claim 14, wherein the second thread processor is included in an inter-thread communication path by setting the inter-thread communication field in the inter-thread communication shared data storage.

16. The system of claim 12, wherein the system further comprises a third thread processor, and wherein setting an inter-thread communication field enables inter-thread communication from the first thread processor to the third thread processor.

17. The system of claim 16, wherein the second software interrupt causes an interrupt at the second thread processor and the third thread processor.

18. The system of claim 12, wherein the inter-thread communication shared data storage comprises a processor register.

19. The system of claim 12, wherein the inter-thread communication occurs without a system interconnect.

* * * * *

UNITED STATES PATENT AND TRADEMARK OFFICE
CERTIFICATE OF CORRECTION

PATENT NO. : 8,726,292 B2  
APPLICATION NO. : 11/212958  
DATED : May 13, 2014  
INVENTOR(S) : So et al.

Page 1 of 1

It is certified that error appears in the above-identified patent and that said Letters Patent is hereby corrected as shown below:

In the Claims

Column 4, line 63, claim 12, please insert --;-- after --interrupt--.

Signed and Sealed this  
Fifth Day of August, 2014

Michelle K. Lee  
*Deputy Director of the United States Patent and Trademark Office*